(12) United States Patent
Castelli et al.

(10) Patent No.: US 10,366,160 B2
(45) Date of Patent: Jul. 30, 2019

(54) AUTOMATIC GENERATION AND DISPLAY OF CONTEXT, MISSING ATTRIBUTES AND SUGGESTIONS FOR CONTEXT DEPENDENT QUESTIONS IN RESPONSE TO A MOUSE HOVER ON A DISPLAYED TERM

(71) Applicant: INTERNATIONAL BUSINESS MACHINES CORPORATION, Armonk, NY (US)

(72) Inventors: Vittorio Castelli, Croton on Hudson, NY (US); Leiming R. Qian, Ardsley, NY (US); Zareen S. Syed, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/282,970

(22) Filed: Sep. 30, 2016

(65) Prior Publication Data
US 2018/0095947 A1   Apr. 5, 2018

(51) Int. Cl.
| G06F 17/27 | (2006.01) |
| --- | --- |
| G10L 15/18 | (2013.01) |
| G06F 3/0484 | (2013.01) |
| G06F 17/28 | (2006.01) |
| G06F 16/332 | (2019.01) |

(52) U.S. Cl.
CPC ...... *G06F 17/2775* (2013.01); *G06F 16/3329* (2019.01); *G06F 17/2881* (2013.01); *G06F 3/04842* (2013.01); *G06F 17/276* (2013.01); *G06F 17/279* (2013.01); *G10L 15/1815* (2013.01)

(58) Field of Classification Search
CPC .. G06F 17/279; G06F 17/276; G06F 3/04842; G10L 15/1815
USPC ...................................... 704/9, 235; 455/566
See application file for complete search history.

(56) References Cited

U.S. PATENT DOCUMENTS

| 6,356,869 B1 | 3/2002 | Chapados et al. |
| --- | --- | --- |
| 7,716,056 B2 | 5/2010 | Weng et al. |
| 8,694,483 B2 | 4/2014 | Roulland et al. |
| 9,098,568 B2 | 8/2015 | Li et al. |
| 9,177,318 B2 | 11/2015 | Shen et al. |

(Continued)

FOREIGN PATENT DOCUMENTS

WO   WO2015134744   9/2015

OTHER PUBLICATIONS

Milne, et al., "Learning to Link with Wikipedia", CIKM'08, Oct. 2008, 10 pages.

(Continued)

*Primary Examiner* — Farzad Kazeminezhad
(74) *Attorney, Agent, or Firm* — Tutunjian & Bitetto, P.C.; Rahan Uddin

(57) ABSTRACT

A method and system are provided for assisting users in a conversation. The method includes identifying concepts in the conversation. The method further includes linking identified concepts in the conversation by matching the identified concepts in the conversation to concepts in a knowledge base. The method also includes generating and displaying on the display device, one or more context dependent suggestions for the conversation based on attributes and values associated with the linked concepts in the knowledge base.

18 Claims, 13 Drawing Sheets

(56) References Cited

U.S. PATENT DOCUMENTS

| | | | |
|---|---|---|---|
| 2010/0145694 A1* | 6/2010 | Ju | G10L 15/1815 704/235 |
| 2011/0105190 A1* | 5/2011 | Cha | G06F 17/276 455/566 |
| 2012/0245922 A1* | 9/2012 | Kozlova | G06F 17/289 704/3 |
| 2012/0253788 A1* | 10/2012 | Heck | G06F 17/279 704/9 |
| 2013/0046777 A1 | 2/2013 | Mohiuddin et al. | |
| 2013/0266925 A1 | 10/2013 | Nunamaker, Jr. et al. | |
| 2014/0074454 A1 | 3/2014 | Brown et al. | |
| 2014/0164509 A1 | 6/2014 | Lynch et al. | |
| 2014/0164532 A1 | 6/2014 | Lynch et al. | |
| 2015/0161651 A1 | 6/2015 | Rodriguez et al. | |
| 2017/0329842 A1* | 11/2017 | Ng Tari | G06F 3/04842 |

OTHER PUBLICATIONS

Syed et al., "Creating and Exploiting a Hybrid Knowledge Base for Linked Data", Creating and Exploiting a Hybrid Knowledge Base for Linked Data, in Agents and Artificial Intelligence, Revised Selected Papers Series: Communications in Computer and Information Science, v129, Springer, Apr. 2011, pp. 1-20.

Syed, "Unsupervised Techniques for Discovering Ontology Elements from Wikipedia Article Links", Proceedings of the NAACL HLT 2010 First International Workshop on Formalisms and Methodology for Learning by Reading, Jun. 2010, pp. 78-86.

Thomson Reuters, Thomson Reuters | Open Calais, "Bring Structure to Unstructured Content", 1 Page, Last accessed on Sep. 30, 2016.

* cited by examiner

AUTOMATIC GENERATION AND DISPLAY OF CONTEXT, MISSING ATTRIBUTES AND SUGGESTIONS FOR CONTEXT DEPENDENT QUESTIONS IN RESPONSE TO A MOUSE HOVER ON A DISPLAYED TERM

BACKGROUND

Technical Field

The present invention relates generally to information processing and, in particular, to automatic generation of context and suggestions for context dependent questions in a conversation scenario.

Description of the Related Art

During an active conversation, people might miss certain details, overlook different aspects and, hence, forget to ask important questions. Thus, there is a need for an approach that provides a solution to the preceding problems that can occur during an active conversation.

SUMMARY

According to an aspect of the present invention, a computer-implemented method is provided for assisting users in a conversation. The computer-implemented method includes identifying concepts in the conversation. The computer-implemented method further includes linking identified concepts in the conversation by matching the identified concepts in the conversation to concepts in a knowledge base. The computer-implemented method also includes retrieving and displaying on a display device, attributes and values associated with the linked concepts in the knowledge base. The computer-implemented method additionally includes generating and displaying on the display device, context dependent suggestions for follow up questions in the conversation based on the attributes and values associated with the linked concepts in the knowledge base.

According to another aspect of the present invention, a computer program product is provided for assisting users in a conversation. The computer program product includes a computer readable storage medium having program instructions embodied therewith. The program instructions are executable by a computer to cause the computer to perform a method. The method includes identifying concepts in the conversation. The method further includes linking identified concepts in the conversation by matching the identified concepts in the conversation to concepts in a knowledge base. The method also includes retrieving and displaying on a display device, attributes and values associated with the linked concepts in the knowledge base. The method additionally includes generating and displaying on the display device, context dependent suggestions for follow up questions in the conversation based on the attributes and values associated with the linked concepts in the knowledge base.

According to yet another aspect of the present invention, a system is provided for assisting users in a conversation. The system includes a computing device having a processor. The computing device is configured to identify concepts in the conversation. The computing device is further configured to link identified concepts in the conversation by matching the identified concepts in the conversation to concepts in a knowledge base. The computing device is also configured to retrieve and display on a display device, attributes and values associated with the linked concepts in the knowledge base. The computing device is additionally configured to generate and display on the display device, context dependent suggestions for follow up questions in the conversation based on the attributes and values associated with the linked concepts in the knowledge base.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures, wherein.

DETAILED DESCRIPTION

The present invention is directed to automatic generation of context and suggestions for context dependent questions in a conversation scenario.

The present invention overcomes the aforementioned limitations and directly provides a list of related attributes and suggestions for questions.

In an embodiment, the present invention assists users in a conversation by identifying and highlighting important topics and attributes which may or may not be explicitly mentioned, providing additional context and suggesting follow up context dependent questions to ask during the conversation in a domain independent and language independent manner. The present invention analyzes the conversation, identifies important concepts, disambiguates the concepts and links the concepts to a background knowledge resource (such as, for example, but not limited to, Wikipedia®) having inter-language links between concepts. The system presents the concept definition and a list of ranked attributes to the user. The user can select any attribute to automatically generate a follow up question regarding that attribute.

Figure 1:
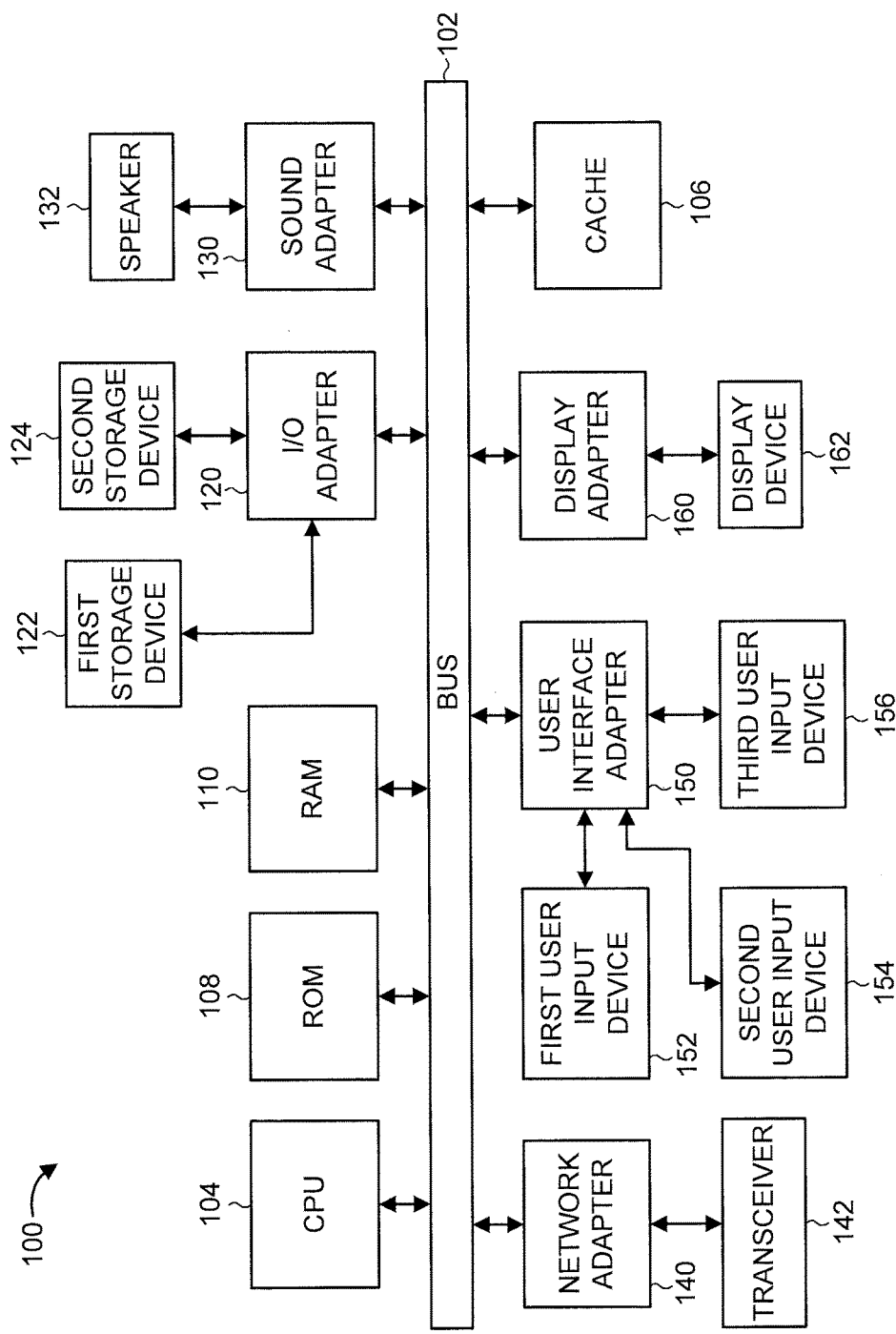
FIG. 1 shows an exemplary system, in accordance with an embodiment of the present invention.

FIG. 1 shows an exemplary system 100, in accordance with an embodiment of the present invention. As depicted, the system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
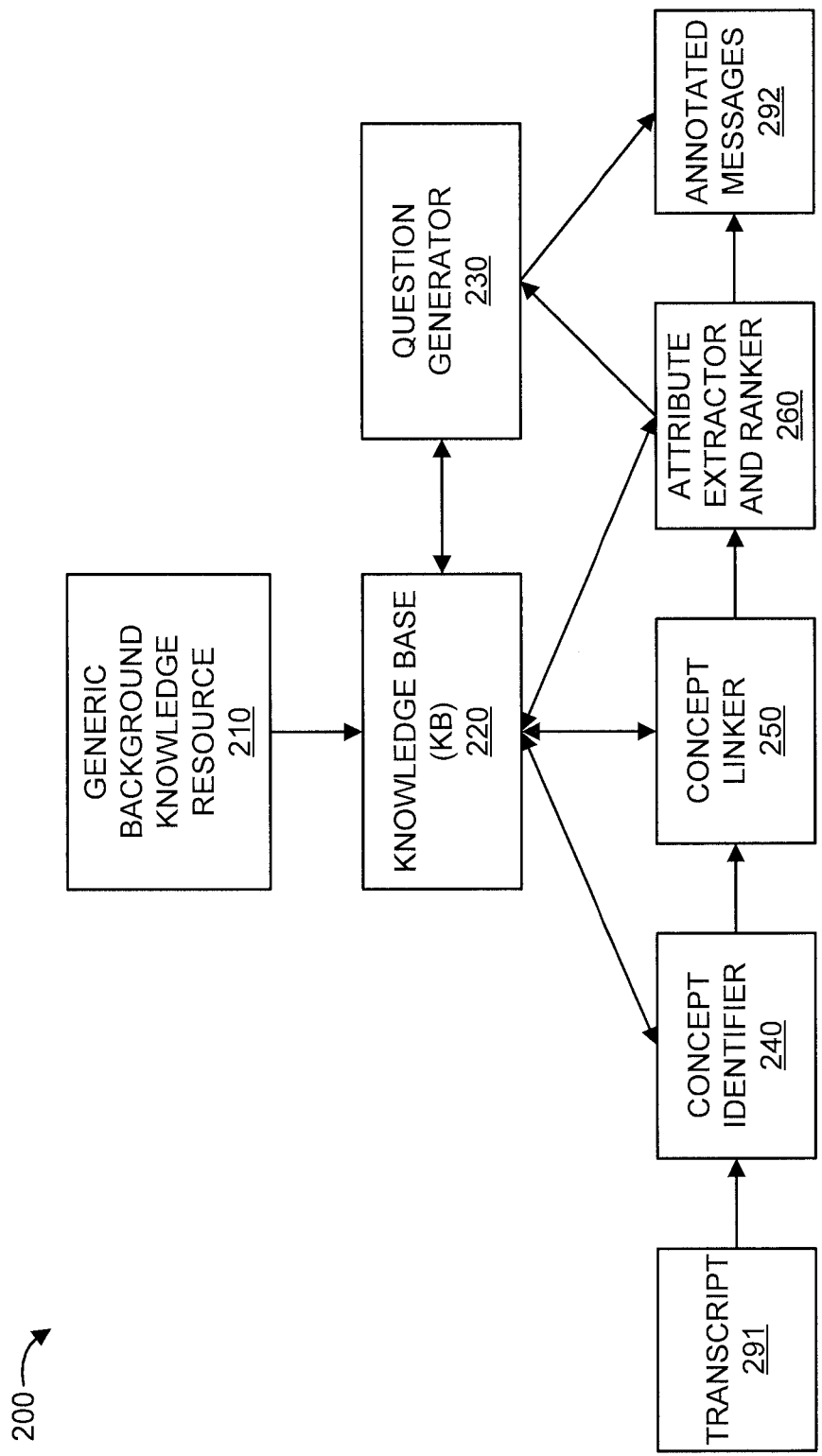
FIG. 2 shows an exemplary architecture, in accordance with an embodiment of the present invention.

Moreover, it is to be appreciated that architecture 200 described below with respect to FIG. 2 is an architecture for implementing respective embodiments of the present invention. Part or all of system 100 may be implemented in one or more of the elements of architecture 200.

Further, it is to be appreciated that system 100 may perform at least part of the method described herein including, for example, at least part of method 300 of FIGS. 3-6. Similarly, part or all of architecture 200 may be used to perform at least part of method 300 of FIGS. 3-6.

FIG. 2 shows an exemplary architecture, in accordance with an embodiment of the present invention. This particular exemplary architecture 200 is configured for automatic generation of context and suggestions for context dependent questions in a conversation scenario, in accordance with an embodiment of the present invention.

For the sake of illustration, the input to architecture 200 is a transcript 291 of a conversation. However, in other embodiments, architecture 200 can include a speech recognition system for generating the transcripts. In yet other embodiments, the conversation can be text-based, in which case translation from speech to text would not be needed. These and other variations on the input to architecture 200 are readily determined by one of ordinary skill in the art given the teachings of the present invention provided herein, while maintaining the spirit of the present invention. The output from architecture 200 can include attributes and attributes values relating to the conversation, concept definitions, one or more context dependent suggestions (e.g., for, but not limited to, follow up questions in the conversation), and so forth. In an embodiment, the output from architecture 200 is provided in the form of annotated messages 292. Of course, other forms of output can also be provided by architecture 200, while maintaining the spirit of the present invention.

The architecture 200 includes a generic background knowledge resource 210, a Knowledge Base (KB), 220, a question generator 230, a concept identifier 240, a concept linker 250, and an attribute extractor and ranker 260.

The generic background knowledge resource 210 includes distinct articles on encyclopedic concepts which are interlinked and organized in a taxonomy along with the presence of interlanguage links between concepts and information boxes with attributes and values related to the subject concept. The generic background knowledge resource 210 can be preprocessed to precompute features (e.g., term frequency-inverse document frequency (tf-idf), etc.) and provide efficient access. In an embodiment, the generic background knowledge resource 210 is Wikipedia®. Of course, other resources can also be used, while maintaining the spirit of the present invention.

The Knowledge Base 220 includes concepts and corresponding concept attributes (hereinafter interchangeably "attributes" in short) as well as values for the attributes. The Knowledge Base 220 can further include interlanguage links between concepts and classes (for those concepts). The Knowledge Base 220 can also include related concepts (and corresponding attributes and values) which can be exploited in accordance with the teachings of the present invention.

The concept identifier 240 identifies concepts in a conversation. The concept identifier 240 can perform such identification using, for example, natural language processing, and so forth.

The concept linker 250 links identifies (links) concepts in the conversation to matching concepts in the Knowledge Base 220. The "linking" of concepts in the conversation to matching concepts in the Knowledge Base 220 can be performed using, for example, but not limited to, cosine similarity, link probability based on the Knowledge base, a link features based on the Knowledge Base 220, and so forth.

The attribute extractor and ranker 260 extracts (retrieves) attributes from the Knowledge Base 220 and ranks the retrieved attributes for display to a user. The attribute extractor and ranker 260 can also provide values for retrieved attributes, as well as provide related attributes and their values. The attribute extractor and ranker 260 can also provide concept definitions responsive to a user action (e.g., a mouse hover). Of course, the items provided by the attribute extractor and ranker 260 can be provided to a display device for viewing by a user. For example, the items can be provided as annotated notes on a conversation transcript displayed on a display device. Of course, the items can be provided in any form, while maintaining the spirit of the present invention.

The question generator 230 generates context dependent suggestions for the conversation. In an embodiment, the context dependent suggestion can be, for example, for follow up questions in a conversation, and so forth. The question generator 230 can include regular expressions and rules for language generation which can reference concepts and classes in a taxonomy present in the Knowledge Base 220. The question generator 230 can generate context dependent suggestions in a domain independent and language independent manner. The question generator 230 does not rely on any domain and language specific linguistic analysis such as POS Tagging, NER or Parsing which require separate models to be trained for each language and domain.

In an embodiment, the question generator 230 can be merely composed of rules and regular expressions that reference concepts and classes in different languages available in the knowledge base. For example, the rule for question generation in the English language could reference the English concept "operating system" and the one for the Italian language could reference the Italian concept "sistema operative". Since the concepts in the Knowledge Base 220 have inter-language links, users could also choose to view a question related to a concept in different supported languages. Generic rule writing could be supported by referencing classes in the taxonomy. For example, the question "Which operating system is needed for <software>" which references the "software" class, can apply to any concept that is a software in the Knowledge Base 220. Generic rule writing would significantly reduce the number of rules needed compared to the number of concepts present in the Knowledge Base 220.

In the embodiment shown in FIG. 2, the elements thereof can be interconnected by a bus(es)/network(s). However, in other embodiments, other types of connections can also be used. Moreover, in an embodiment, at least one of the elements of architecture 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of architecture 200 are readily determined by one of ordinary skill in the art, given the teachings of the present invention provided herein, while maintaining the spirit of the present invention.

FIGS. 3-6 show an exemplary method 300 for automatic generation of context and suggestions, in accordance with an embodiment of the present invention.

Figure 3:
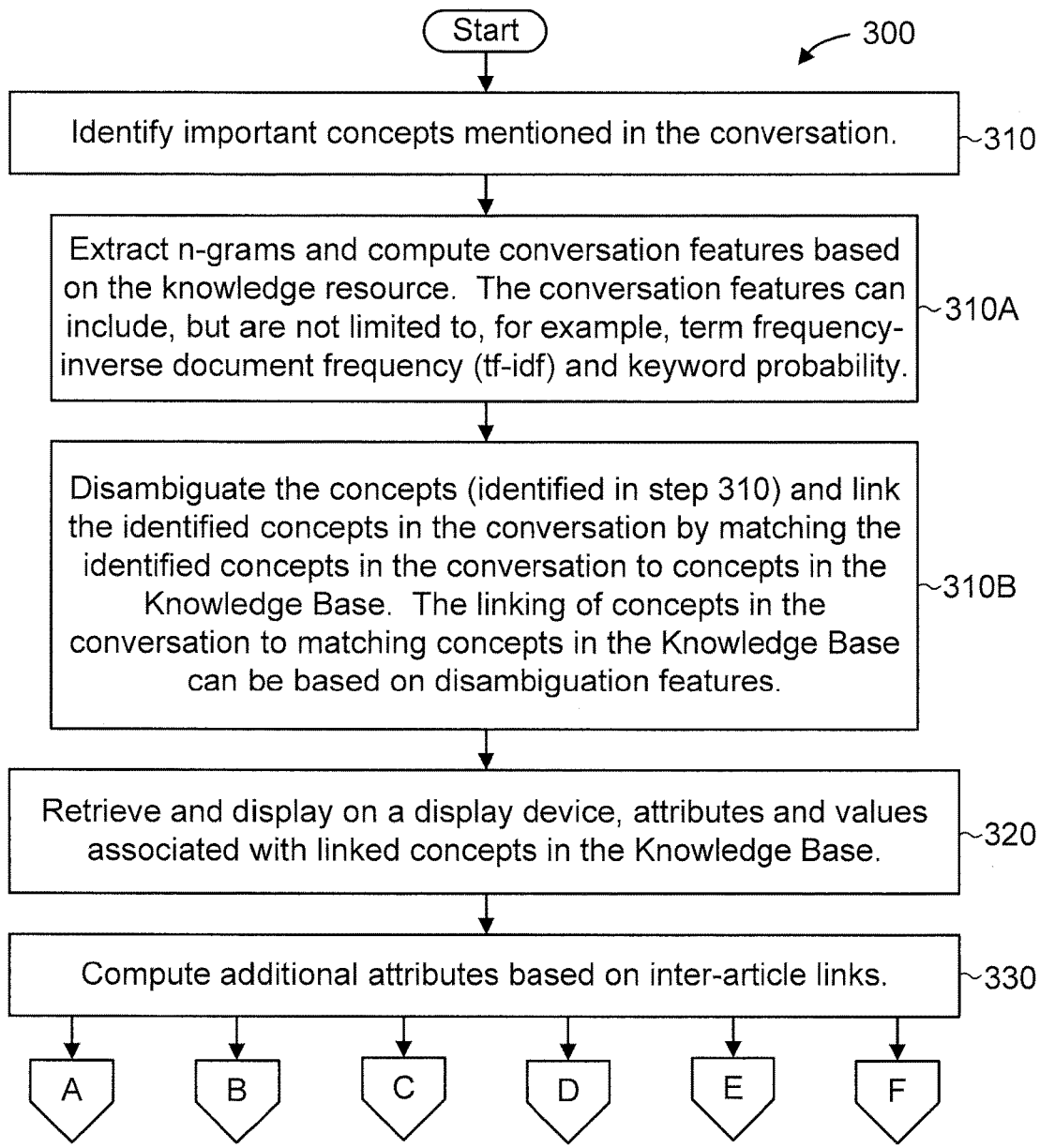
FIGS. 3-6 show an exemplary method for automatic generation of context and suggestions, in accordance with an embodiment of the present invention.

Referring now to FIG. 3, in step 310, concepts mentioned in the conversation are identified. In an embodiment, step 310 can be performed using the generic background knowledge resource. Of course, other resources can also be used.

In an embodiment, step 310 includes step 310A.

In step 310A, extract n-grams and compute conversation features based on the knowledge resource. In an embodiment, the conversation features include, but are not limited to, for example, term frequency-inverse document frequency (tf-idf) and keyword probability. In an embodiment, the keyword probability can be:

$$\frac{\text{number of times the term is selected as a keyword}}{\text{number of times the term is mentioned in the corpus}}.$$

Of course, other conversation features can be used. The method 300 does not rely on language dependent models such as for Part of Speech (POS) tagging, Named Entity Recognizer (NER), or parsing.

In step 320, disambiguate the concepts (identified in step 310) and link the identified concepts in the conversation by matching the identified concepts in the conversation to concepts in the Knowledge Base. The linking of concepts in the conversation to matching concepts in the Knowledge Base can be based on disambiguation features. The disambiguation features can include, but are not limited to, cosine similarity between the conversation context and a target concept context in the Knowledge Base, a link probability of a given keyword (e.g., the number of times the given keyword is linked to a particular concept, etc.), and/or a link popularity feature. It is to be appreciated that the preceding disambiguation features can be directly computed from the Knowledge Base. The linking of concepts can also be based on training performed on existing Knowledge Base articles.

Referring again to FIG. 3, in step 330, retrieve and display on a display device, attributes and values associated with linked concepts in the Knowledge Base. In an embodiment, these attributes and values are displayed to the user as information boxes in articles such as, for example, Wikipedia® articles.

Figure 4:
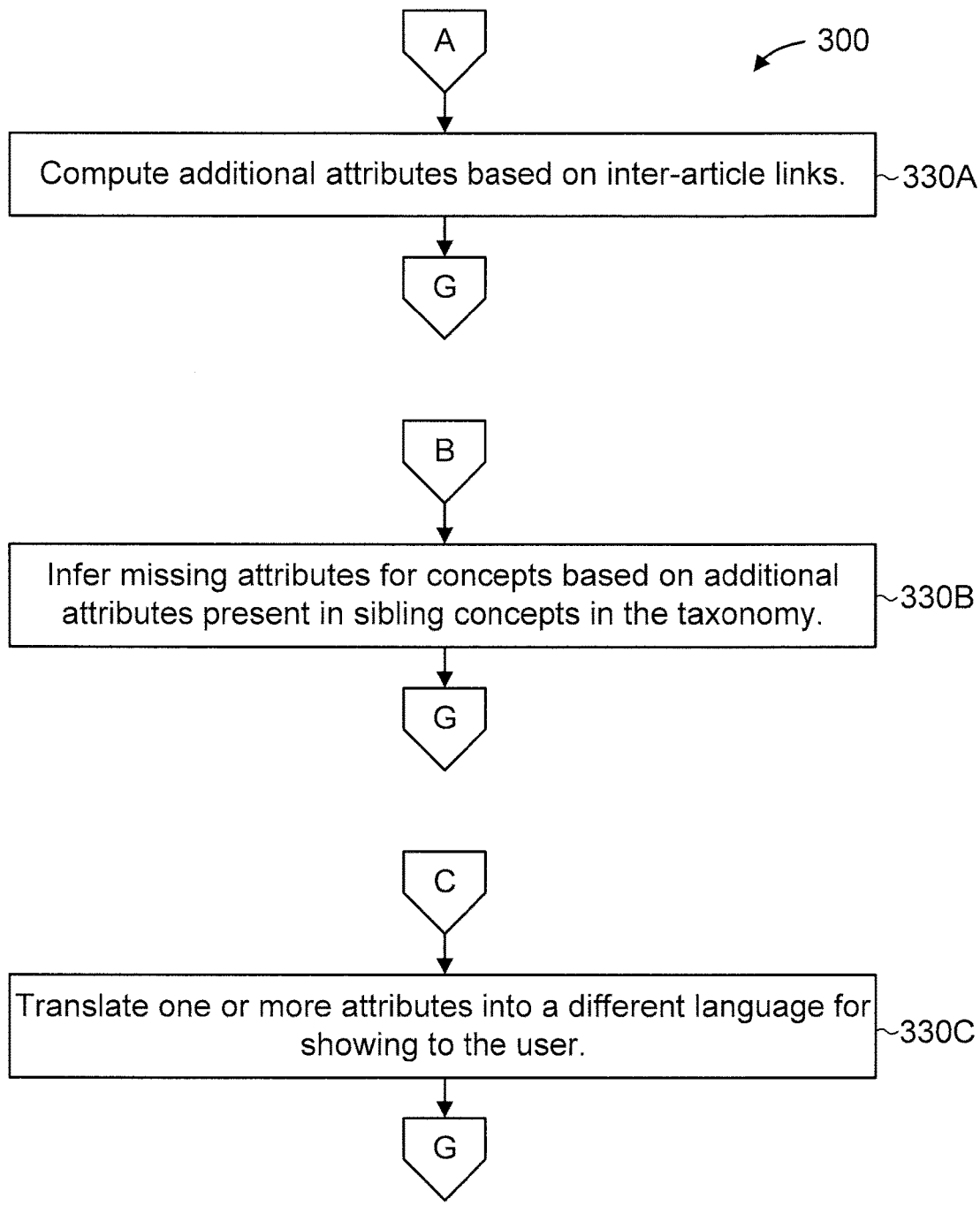
Figure 5:
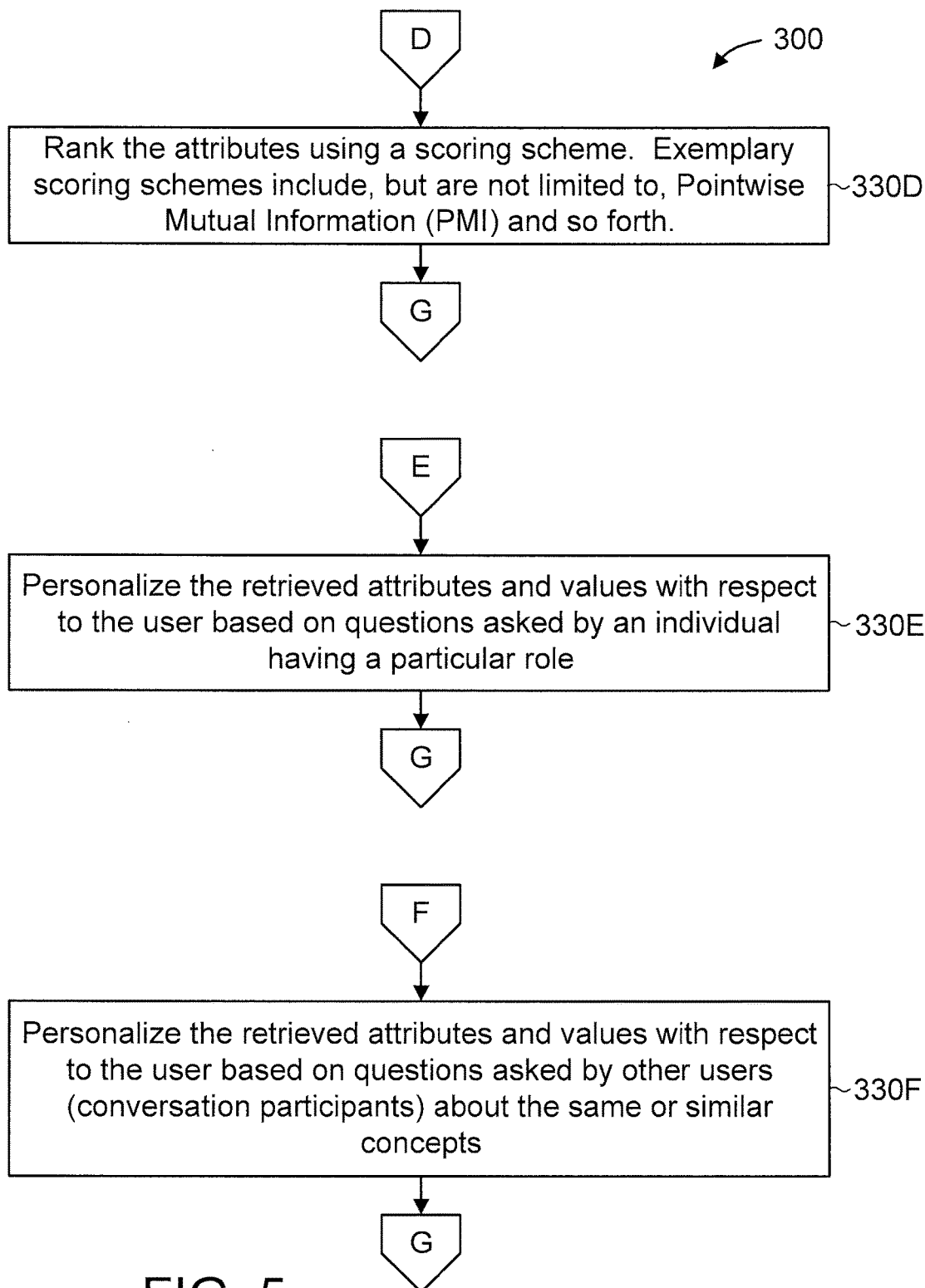
Figure 6:
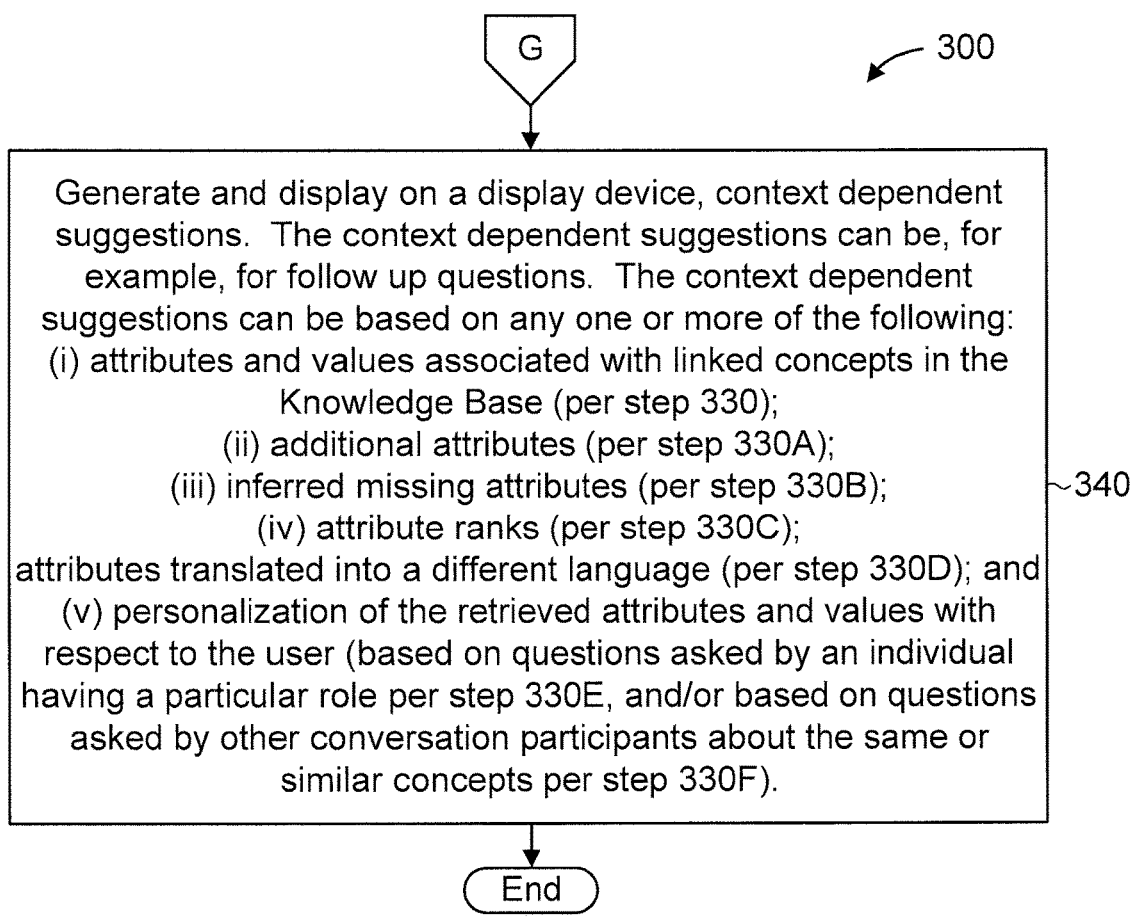

In an embodiment, step 330 includes one or more of steps 330A (as shown in FIG. 4), 330B (as shown in FIG. 4), 330C (as shown in FIG. 4), 330D (as shown in FIG. 5), 330E (as shown in FIG. 5), and 330F (as shown in FIG. 5). Off page connectors A through G are used to interconnect the steps across FIGS. 3-6.

Referring again to FIG. 4, in step 330A, compute additional attributes based on inter-article links.

Figure 7:
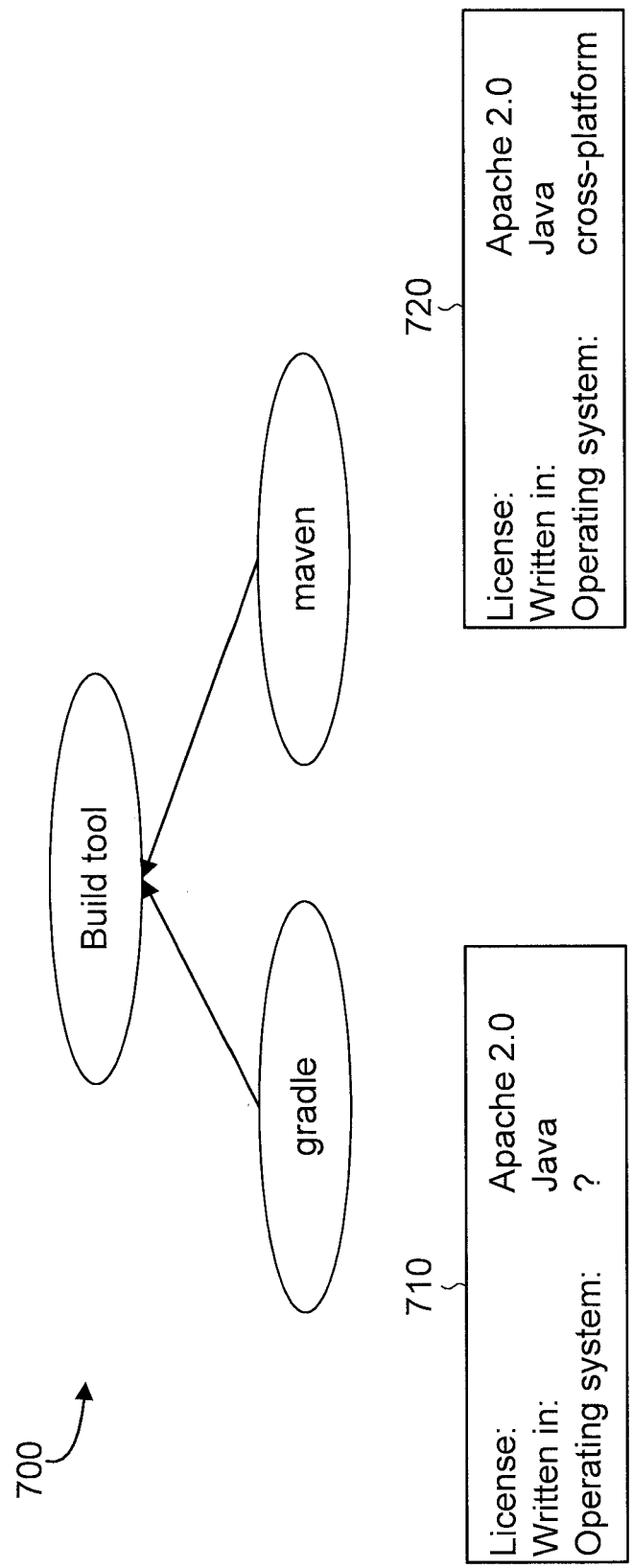
FIG. 7 shows an exemplary taxonomy, in accordance with an embodiment of the present invention.

In step 330B, infer missing attributes for concepts based on additional attributes present in sibling concepts in the taxonomy. As an example regarding inferring missing attributes as per step 330B, FIG. 7 shows an exemplary taxonomy 700 from which missing attributes for concepts can be inferred based on additional attributes present in sibling concepts in the taxonomy 700, in accordance with an embodiment of the present invention. For example, in a first information box 710 for the term "gradle", and in second information box 720 for the term "maven", the following information is listed if known: "license"; (computer language) "written in"; and "operating system".

Referring again to FIG. 4, in step 330C, translate one or more attributes into a different language for showing to the user.

Referring again to FIG. 5, in step 330D, rank the attributes using a scoring scheme. Exemplary scoring schemes include, but are not limited to, Pointwise Mutual Information (PMI) and so forth.

In step 330E, personalize the retrieved attributes and values with respect to the user based on questions asked by an individual having a particular role (e.g., legal, product manager, etc.).

In step 330F, personalize the retrieved attributes and values with respect to the user based on questions asked by other users (conversation participants) about the same or similar concepts.

Referring again to FIG. 6, in step 340, generate and display on a display device, context dependent suggestions. In an embodiment, the context dependent suggestions can be, for example, for follow up questions. The context dependent suggestions can be based on any one or more of the following: (i) attributes and values associated with linked concepts in the Knowledge Base (per step 330);

additional attributes (per step 330A); (ii) inferred missing attributes (per step 330B); (iii) attribute ranks (per step 330C); (iv) attributes translated into a different language (per step 330D); and (v) personalization of the retrieved attributes and values with respect to the user (based on questions asked by an individual having a particular role per step 330E, and/or based on questions asked by other conversation participants about the same or similar concepts per step 330F).

Regarding the context dependent suggestions, the question generator can include regular expressions and rules for language generation which can reference concepts and classes in the Knowledge Base taxonomy.

Figure 8:
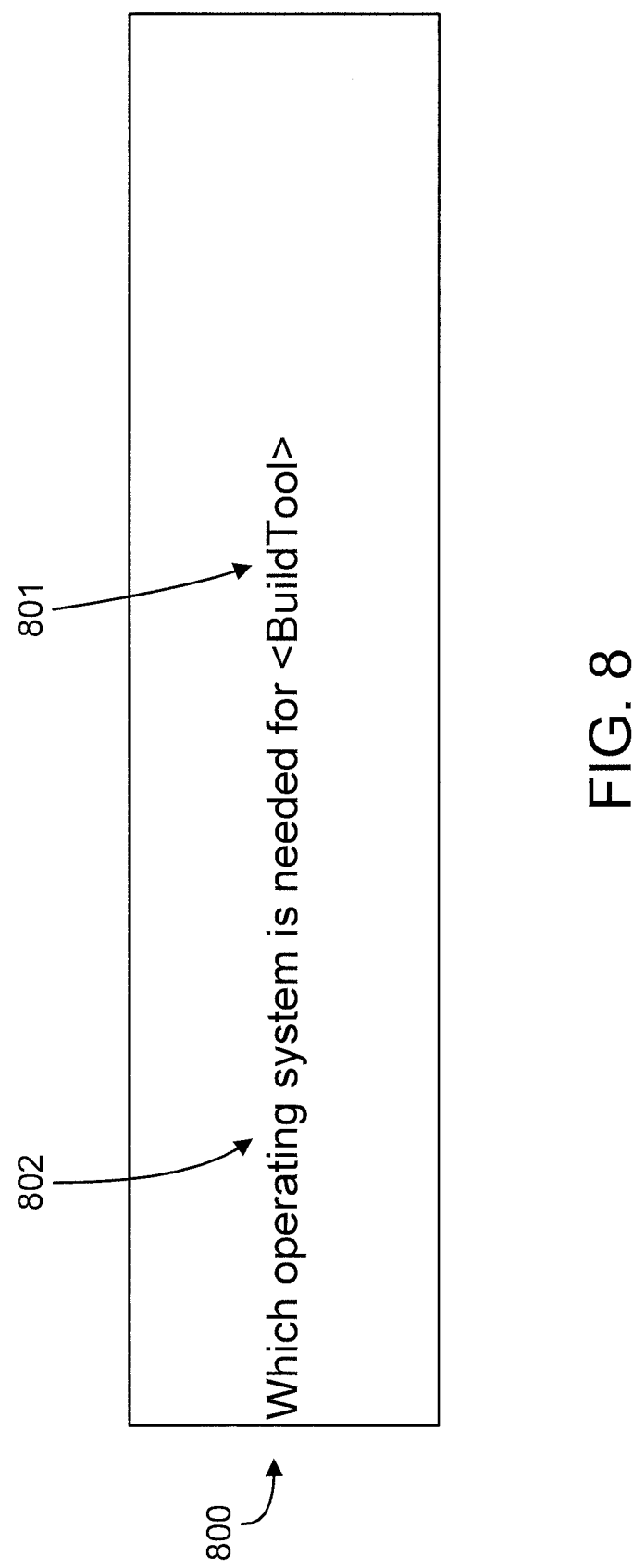
FIG. 8 shows an exemplary generic regular expression, in accordance with an embodiment of the present invention.

FIG. 8 shows an exemplary generic regular expression 800 written by the question generator using references to classes (e.g., "<BuildTool>") 801 in the KB taxonomy, in accordance with an embodiment of the present invention. In the expression 800, "operating system" would be an attribute 802. Since the Knowledge Base has interlanguage links between concepts and classes, the regular expressions and rules can reference target concepts in any available language.

The present invention assists the user in conversation by highlighting important terms and providing more context in the form of term definitions and related attributes and provides suggestions for context dependent questions.

Figure 9:
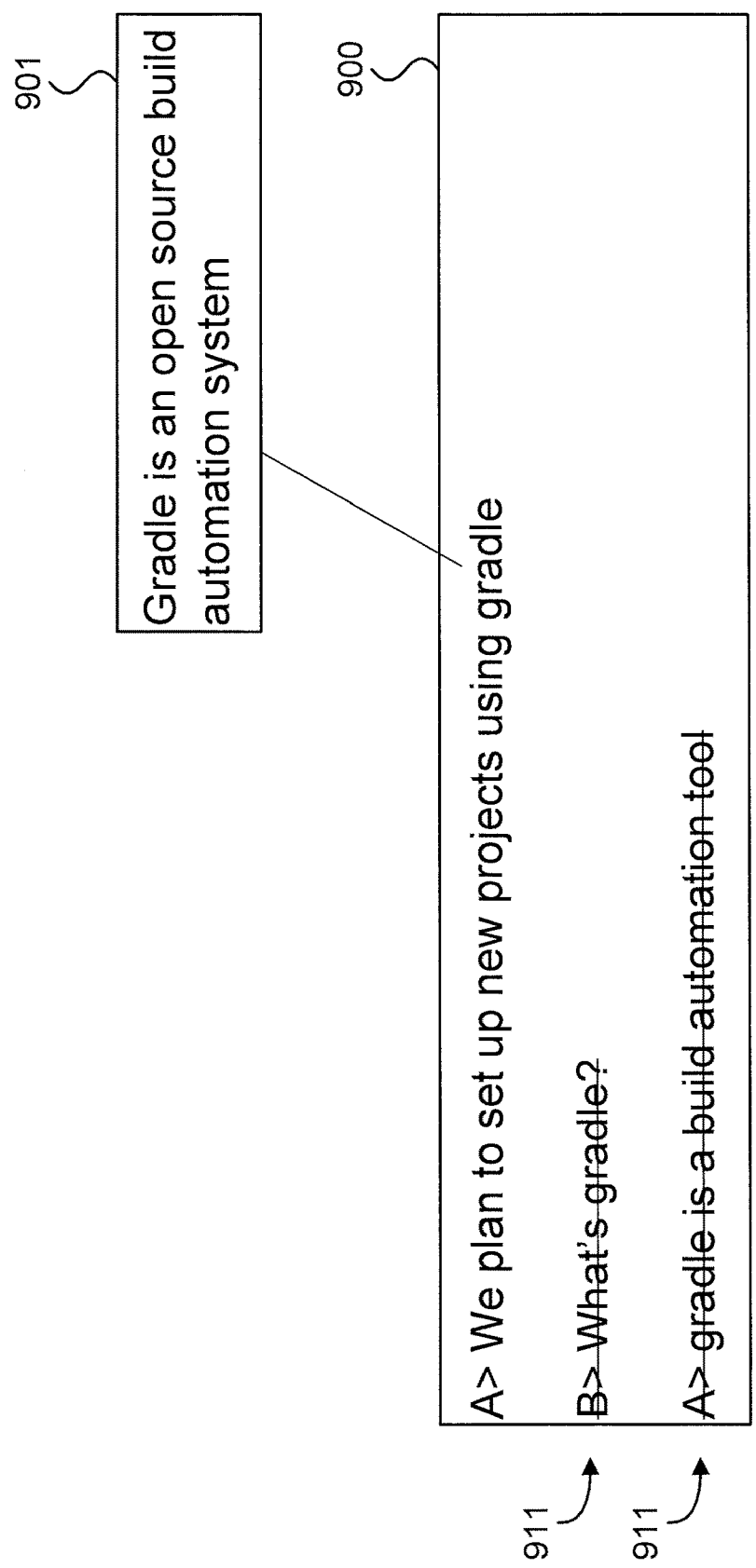
FIG. 9 shows an exemplary display view, in accordance with an embodiment of the present invention.

Consider a conversation scenario where a user encounters a new term or entity. The user either asks the other person for information about the term or looks it up online. Both of these actions incur an additional overhead, however, with the assistance provided by the present invention the user can directly view the definition of the term responsive to an action such as a mouse hover. FIG. 9 shows an exemplary display view 900 of a term definition 901 (for the term "gradle") provided responsive to a user action (mouse hover), in accordance with an embodiment of the present invention. Automatically detecting and disambiguating important concepts and presenting their definition on a user action (e.g., a mouse hover) as per FIG. 9 can eliminate the need for additional interaction (as represented by the two crossed out interactions 911) and save time.

Figure 10:
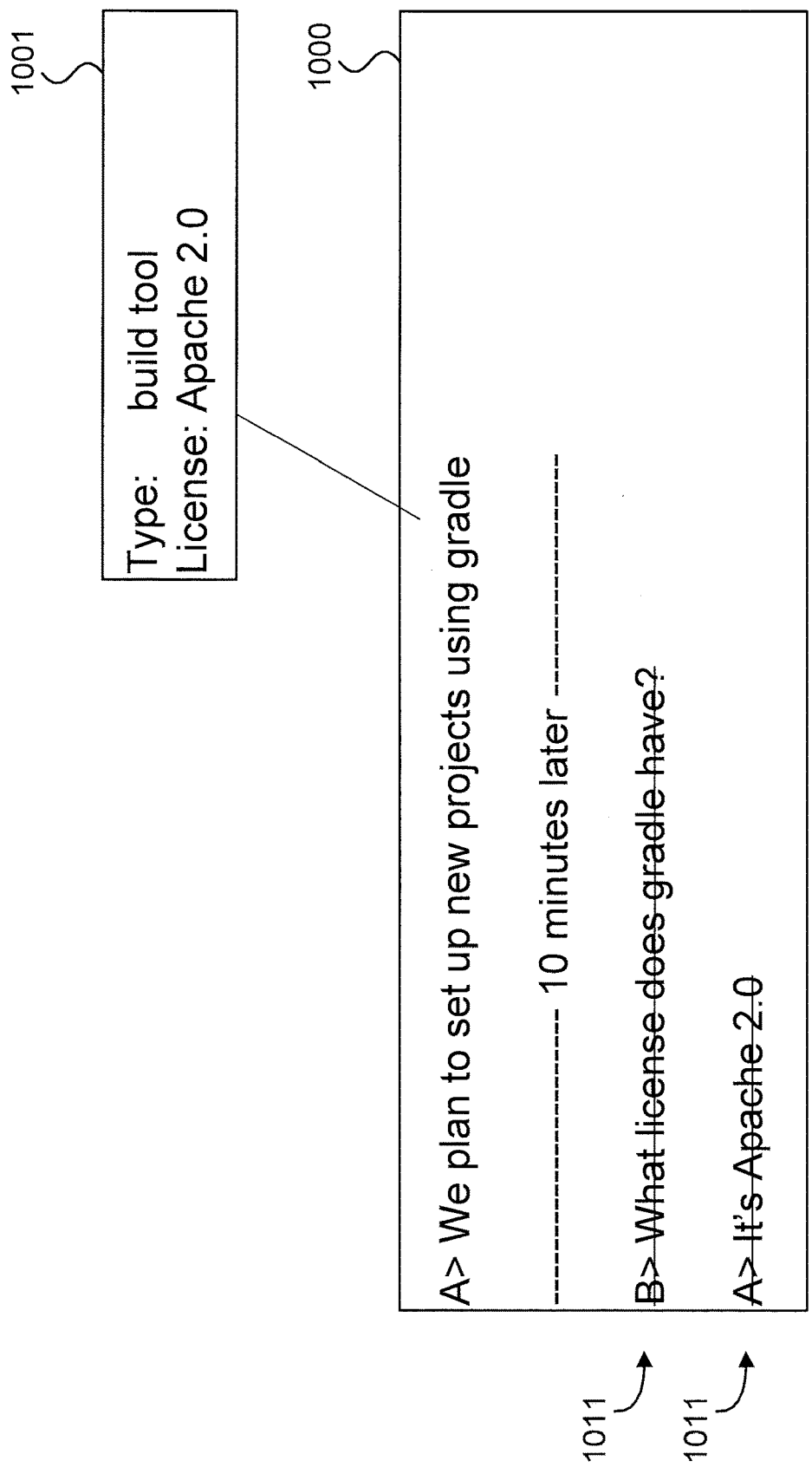
FIG. 10 shows another exemplary display view, in accordance with an embodiment of the present invention.

Consider another scenario where the user knows about the term or entity but wishes to consider related attributes which might be important in driving the discussion and decision making. The user might think of these attributes after the conversation is over and would need to get that information through additional communication. The present invention assists the user by highlighting important attributes which might not be explicitly mentioned in the conversation, based on information derived from the background knowledge resource. For some of the attributes, there might be information in the knowledge base, which can be presented to the user. FIG. 10 shows an exemplary display view 1000 of an automatically highlighted important attribute (e.g., "license") 1001 not explicitly mentioned in a conversation, in accordance with an embodiment of the present invention. Highlighting important attributes that might not be explicitly mentioned in the conversation (such as "license" in the above example) can help the user from missing or overlooking important attributes, reduce communication overhead (by eliminating additional interaction (as represented by the two crossed out interactions 1011)), and aid in making decisions.

Figure 11:
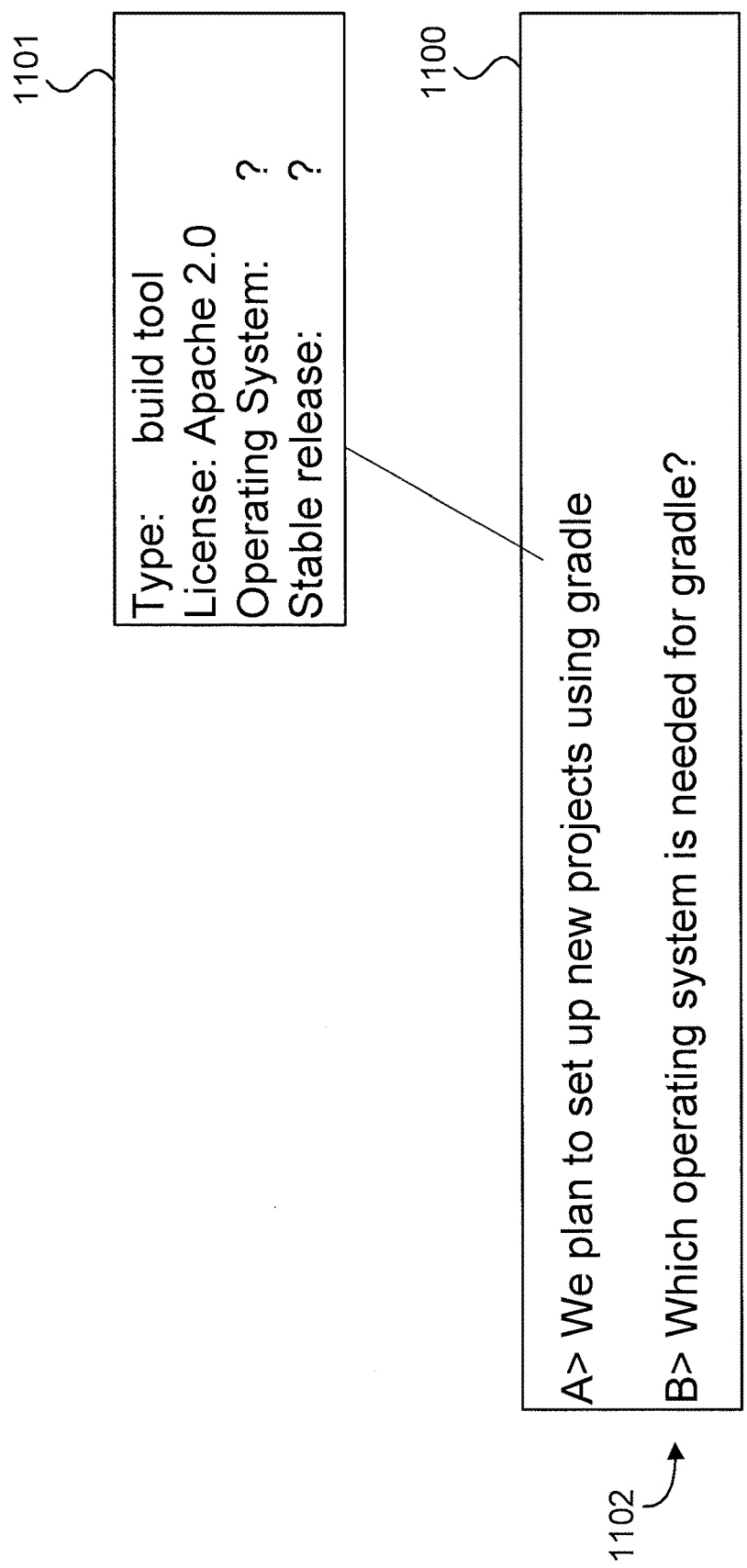
FIG. 11 shows another exemplary display view, in accordance with an embodiment of the present invention.

For attributes with missing information, the user can select or click an attribute and the present invention will automatically generate a follow up question based on that attribute. FIG. 11 shows an exemplary display view 1100 of suggestions 1101 for context dependent follow up questions 1102, in accordance with an embodiment of the present invention. Providing suggestions 1101 for context dependent follow up questions 1102 can help in driving the discussion and assist the user in asking for relevant information that might be useful in decision making. Thus, in this case, the suggestions 1101 of "Operating system" and "Stable release" result in the context dependent follow up question 1102 "Which operating system is needed for gradle".

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
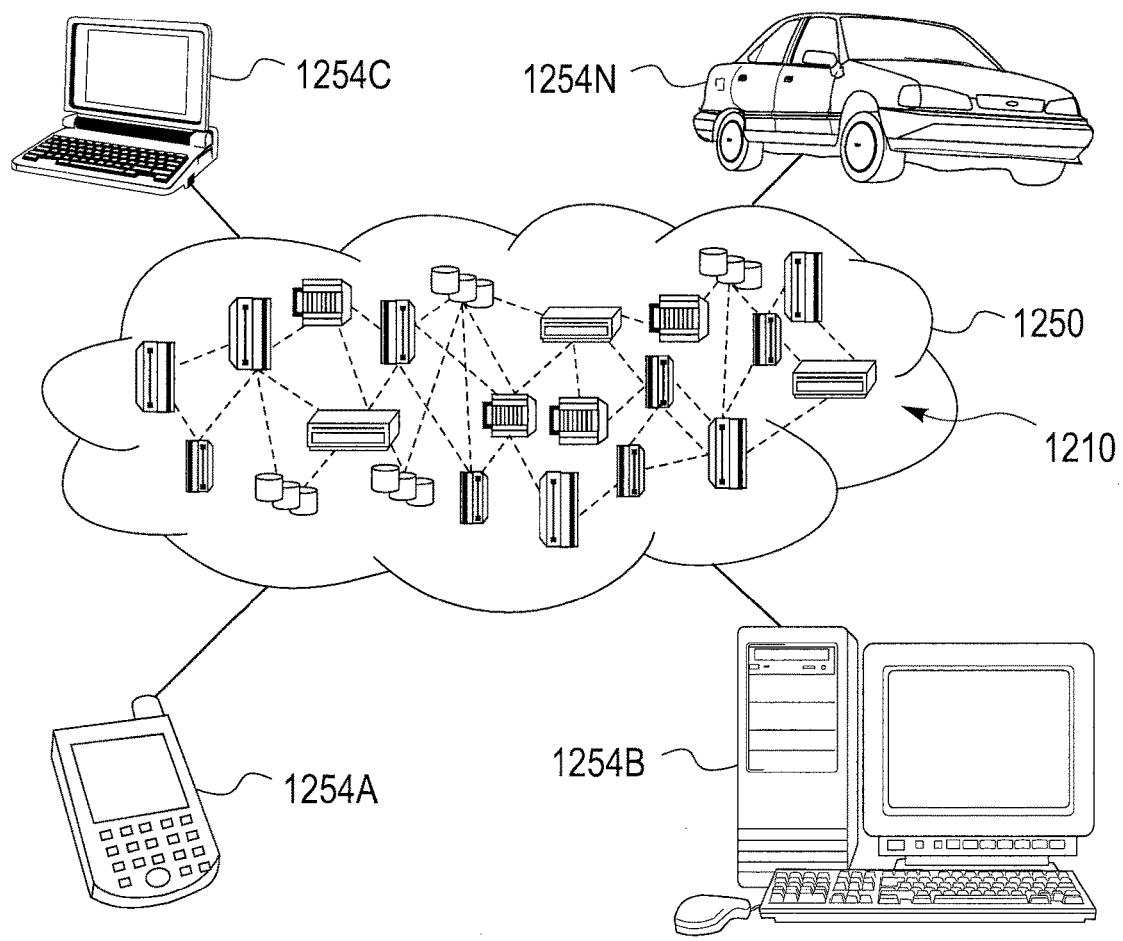
FIG. 12 shows an exemplary cloud computing environment, in accordance with an embodiment of the present invention.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
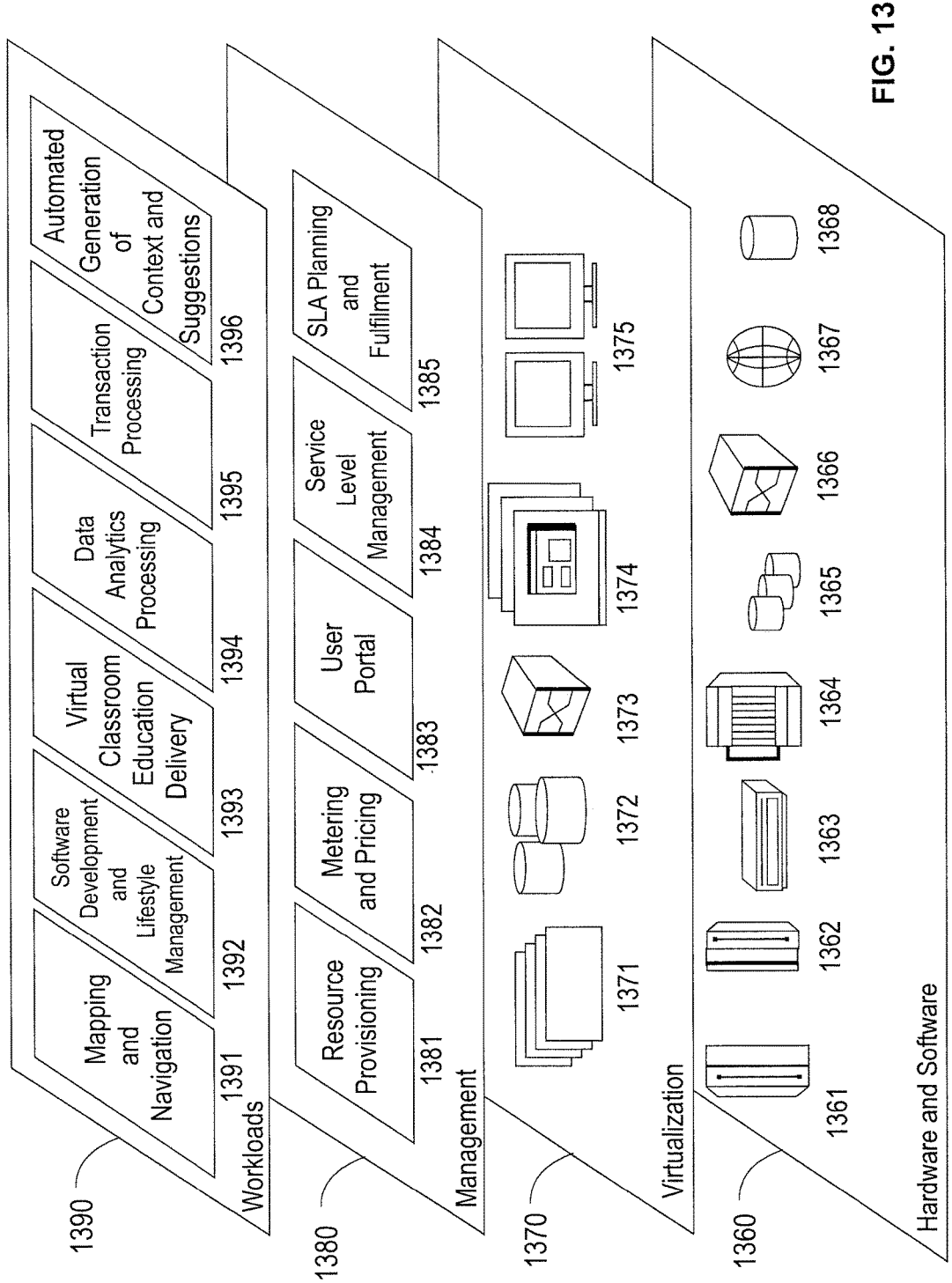
FIG. 13 shows an exemplary set of functional abstraction layers provided by the exemplary cloud computing environment shown in FIG. 12, in accordance with an embodiment of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and automated generation of context and suggestions for context dependent questions in a conversation scenario 1396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected is set forth in the appended claims.

The invention claimed is:

1. A computer-implemented method for assisting users in a conversation, comprising:
    identifying concepts in the conversation;
    linking identified concepts in the conversation by matching the identified concepts in the conversation to concepts in a knowledge base; and
    generating and displaying on a display device, one or more domain and language independent user-specific context dependent suggestions for discussion questions for the conversation based on attributes and values associated with the linked concepts in the knowledge base by automatically disambiguating concepts identified as important, and inferring missing attributes for the matching concepts in the knowledge base based on additional attributes present in sibling concepts in a taxonomy in the knowledge base,
    wherein the context-dependent suggestions for discussion questions are automatically generated and presented to one or more of the particular users in real-time using a personalized interface of the display device, the context-dependent suggestions including one or more suggestions for discussion questions generated based on the inferred missing attributes, and
    wherein important topics not explicitly mentioned in the conversation are identified, presented, and highlighted in real-time to aid the users during the conversation in response to a user mouse hover or click on a displayed term.

2. The computer-implemented method of claim 1, further comprising retrieving and displaying on a display device, the attributes and the values associated with the linked concepts in the knowledge base.

3. The computer-implemented method of claim 2, wherein the attributes and values are displayed as information boxes in articles.

4. The computer-implemented method of claim 2, wherein said retrieving and displaying step comprises personalizing the attributes and values with respect to the user based on questions asked by a conversation participant having a particular role.

5. The computer-implemented method of claim 2, wherein said retrieving and displaying step comprises personalizing the attributes and values with respect to the user based on questions asked by other conversation participants about identical or similar concepts.

6. The computer-implemented method of claim 2, wherein said retrieving and displaying step comprises displaying at least one related attribute to the matching concepts in the knowledge base, wherein the at least one related attribute is unmentioned in the conversation.

7. The computer-implemented method of claim 2, further comprising displaying a concept definition on the display device responsive to a user action.

8. The computer-implemented method of claim 1, wherein the concepts in the conversation are identified based on n-grams extracted from the conversation.

9. The computer-implemented method of claim 1, wherein the concepts in the conversation are identified based on conversation features precomputed with respect to an externally accessible knowledge source.

10. The computer-implemented method of claim 1, wherein the concepts in the conversation are identified based on frequency-dependent conversation features and keyword probabilities.

11. The computer-implemented method of claim 1, further comprising disambiguating the concepts, prior to said linking step, and wherein the concepts are disambiguated using disambiguation features selected from a group consisting of a text similarity between a conversation context and a target concept context in the knowledge base, a link probability, and a link popularity feature.

12. The computer-implemented method of claim 1, further comprising computing additional attributes based on inter-article links in the knowledge base.

13. The method of claim 1, further comprising ranking the attributes using an attribute scoring scheme.

14. The computer-implemented method of claim 1, wherein the one or more context dependent suggestions are for follow up questions for the conversation.

15. The computer-implemented method of claim 1, wherein software is provided as a service in a cloud environment to generate and display the one or more context dependent suggestions.

16. A non-transitory computer program product for assisting users in a conversation, the computer program product comprising a computer readable storage medium having computer readable program instructions embodied therewith, the computer readable program instructions executable by a computer to cause the computer to perform a method comprising:
    identifying concepts in the conversation;
    linking identified concepts in the conversation by matching the identified concepts in the conversation to concepts in a knowledge base; and
    generating and displaying on a display device, one or more domain and language independent user-specific context dependent suggestions for discussion questions for the conversation based on attributes and values associated with the linked concepts in the knowledge base by automatically disambiguating concepts identified as important, and inferring missing attributes for the matching concepts in the knowledge base based on additional attributes present in sibling concepts in a taxonomy in the knowledge base,
    wherein context-dependent follow-up questions for attributes with missing information are automatically generated and presented to a particular user in real-time responsive to the particular user clicking on a particular attribute with missing information using a personalized, interactive interface of the display device, and
    wherein important topics not explicitly mentioned in the conversation are identified, presented, and highlighted in real-time to aid the particular user during the conversation in response to a user mouse hover or click on a displayed term.

17. A system for assisting users in a conversation, comprising:

a computing device having a processor device and a memory operably coupled to the processor, the computing device being configured to:

identify concepts in the conversation;

linking identified concepts in the conversation by matching the identified concepts in the conversation to concepts in a knowledge base; and generate and display on a display device, one or more domain and language independent user-specific context dependent suggestions for discussion questions for the conversation based on attributes and values associated with the linked concepts in the knowledge base by automatically disambiguating concepts identified as important, and inferring missing attributes for the matching concepts in the knowledge base based on additional attributes present in sibling concepts in a taxonomy in the knowledge base, wherein context-dependent follow-up questions for attributes with missing information are automatically generated and presented to a particular user in real-time responsive to the particular user clicking on a particular attribute with missing information using a personalized, interactive interface of the display device, and wherein important topics not explicitly mentioned in the conversation are identified, presented, and highlighted in real-time to aid the user during the conversation in response to a user mouse hover or click on a displayed term.

18. The system of claim 17, wherein the system is configured using a cloud configuration.

* * * * *